No. 891,460. PATENTED JUNE 23, 1908.
W. J. CAMPBELL & G. W. HEDRICK.
COMBINED FRONT AND APRON FOR VEHICLES.
APPLICATION FILED AUG. 7, 1907.
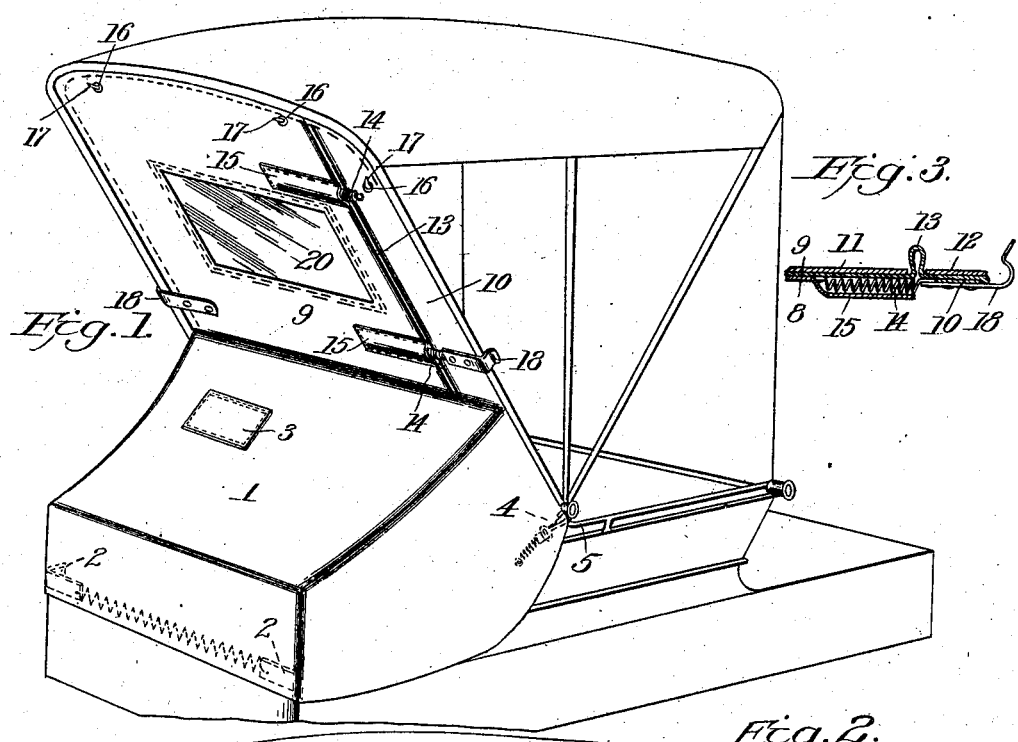
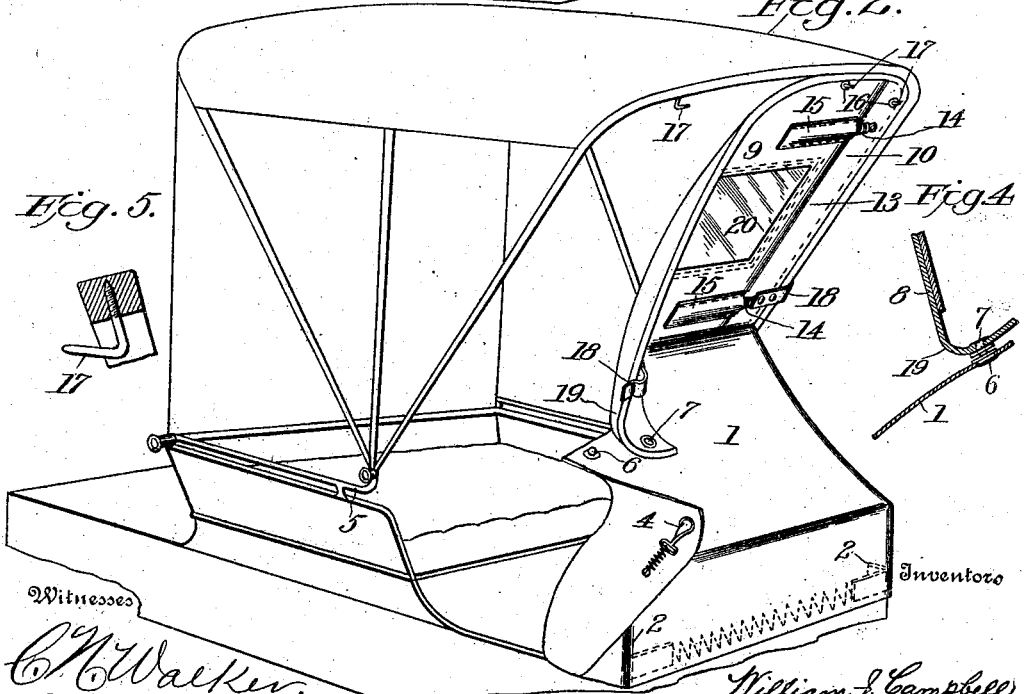

UNITED STATES PATENT OFFICE.

WILLIAM J. CAMPBELL AND GEORGE W. HEDRICK, OF DAYTON, VIRGINIA.

COMBINED FRONT AND APRON FOR VEHICLES.

No. 891,460.      Specification of Letters Patent.      Patented June 23, 1908.

Application filed August 7, 1907. Serial No. 387,541.

*To all whom it may concern:*

Be it known that we, WILLIAM J. CAMPBELL and GEORGE W. HEDRICK, citizens of the United States, residing at Dayton, in the county of Rockingham and State of Virginia, have invented a certain new and useful Improvement in Combined Fronts and Aprons for Vehicles, of which the following is a full, clear, and exact description.

This invention relates to storm fronts and aprons adapted to be attached to a vehicle to protect the occupant or occupants of the vehicle from wind, rain, snow, etc.

The object of the invention is to provide a combined front and apron in which the front and apron are made separate and adapted to be detachably connected, whereby either may be used separately, or the two connected to form the combined front and apron for use as such when desired.

A further object of the invention is to provide a storm front with means to take up the slack and keep it properly extended, so as to fit vehicles having tops of different widths.

A still further and important object of the invention is to provide a combined storm front and apron which may be quickly put in place and securely held against accidental displacement and which may readily and quickly be detached by the occupant of the vehicle without manipulation of its fastenings by hand, and without releasing the reins, so that the occupant of the vehicle in case of a runaway or other danger may readily jump from the vehicle.

The invention consists in the parts and combinations of parts for effecting these several objects, all as we will proceed now more particularly to set forth and finally claim.

In the accompanying drawings, illustrating the invention, in the several figures of which like parts are similarly designated. Figure 1 is a perspective view of the body of a vehicle with the invention applied thereto in position of use. Fig. 2 is an opposite perspective view of the body of a vehicle showing the front and apron detached at one side. Fig. 3 is a horizontal section of a portion of the front showing the slack take-up, and one of the fastening clips. Fig. 4 is a vertical section of the lower portion or skirt of the front and upper portion of the apron, showing the separable fastenings therefor. Fig. 5 is a cross-section on a larger scale, of the upper portion of the bow of the vehicle top, showing one of the hooks for supporting the upper portion of the front.

The apron 1 may be of any approved construction, and is preferably provided with elastic hook connections 2 for engaging the side bars of the dashboard as shown in dotted lines in Figs. 1 and 2. The apron is also provided with the usual slit and protecting flap 3 for the driving reins. The apron also may be provided with hooks 4 or other suitable fastenings at its corners to be connected with any suitable part of the vehicle, such as the rail 5, to prevent the apron from flapping. However, these hooks need be used only when it is absolutely necessary for protection from extreme weather. The upper edge of the apron is provided with a series of fastenings for engagement with the complemental fastenings on the lower edge or skirt of the front, and preferably these fastenings may be of the resilient head and socket type, and as shown in Fig. 4, the head members 6 may be placed upon the apron and the socket members 7 upon the front.

The apron is constructed of any suitable waterproof material and is shaped to fit over the front of the vehicle in the usual manner. The front is preferably constructed of a single piece of waterproof material 8, shaped to fit within the front or second bow of the top of the vehicle, and the sections 9, 10, are preferably reinforced or stiffened by backings 11 and 12, see Fig. 3, leaving an unstiffened and flexible portion 13 of the material of the front between the sections 9 and 10 throughout the length of the front. In order to maintain the flexible portion 13 in a state that will insure the distention of the front, without undue slack across the front of the vehicle, any suitable elastic connections are secured at their opposite ends to the edges of the sections 9 and 10 so as to span the flexible portion 13. For this purpose we have herein shown coiled springs 14 (incased in suitable casings 15) and secured at one of their ends to the section 9 and at their other ends to the edge of the section 10. Two of such elastic connections are herein shown, but any number of such connections may be used as may be desired. These elastic connections are so arranged that they will maintain the flexible portion 13 of the front in a distended condition commensurate with the width of the vehicle, and it will be observed that pull upon the opposite edges of the front will expand the springs or other elastic connections and the sections 9 and 10 being drawn away from each other will open or spread out the flexible portion 13. By these means we provide an adjustable front which will fit vehicle tops of various widths, and will always and automatically be distended by the spring connections taking up the slack.

The upper edge of the front is provided with a suitable number of eyelets or gromets 16 adapted to engage hooks 17 secured to the front bow of the vehicle top, and for the purpose of this invention and the ready detachability of the front, these hooks are preferably constructed with their hook portions turned outwardly and upwardly just sufficiently to hold the front from displacement under normal conditions, but which will permit the ready disengagement of the front from the hooks upon pressure upon the front from the inside of the vehicle.

Metal clips 18, 18, are secured to the outer edges of the front sections 9 and 10 and preferably in alinement with the lower elastic or spring connection 14, and these clips 18 are so shaped to have a slip or snap engagement with the side bars of the bow, the elasticity of the spring connection 14 being sufficient to hold the clips in engagement with the bow to hold the lower part of the front in position. The front terminates at the bottom in a flexible skirt portion 19, which, as hereinbefore stated, is provided with the socket members 7 of the separable fastening devices adapted to engage the complemental stud or head members 6 on the apron. The front is also provided with the usual window 20 which may be of any suitable flexible transparent material. When the front and apron are not in use, they may be separated and rolled up in comparatively small compass and stowed away in the body of the vehicle.

When it is desired to use the device, the apron is placed upon the dashboard in the usual manner, and the front put in place and the skirt portion 19 of the front fastened to the upper portion of the apron as shown in Fig. 4, when the combined front and apron appears as in Fig. 1.

In case of a runaway or other imminent danger, and the driver or occupant of the vehicle finds it necessary or deems it advisable to jump from the vehicle, it is only necessary for the driver to force some portion of his body, say his knee or his elbow, against the front at or about the clip 18 on the right hand side of the vehicle, and thus detach the clip from the bow, and by further pressure upon the front, the front will become disengaged from one or more of the hooks at the top of the bow and assume the position shown in Fig. 2, and thus make a free passage for the driver or occupant of the vehicle to jump therefrom. Thus it will be observed that the front and apron may readily be detached for the escape of the driver, without the manipulation of the fastenings by hand, and hence the driver may hold on to the reins and be getting the runaway animal under check and open the front for his escape at the same time.

We do not wish to be understood as limiting our invention to the exact details of construction and arrangement of parts herein shown and described, as the same may be altered in various particulars and still be within the scope of the invention.

What we claim is:—

1. In a combined front and apron for vehicles, a front constructed of two stiffened portions and an intermediate flexible portion connecting said stiffened portions, and elastic connections secured to said stiffened portions and spanning said flexible portion to maintain it in a distended condition when in use on vehicles of different widths.

2. In a combined front and apron for vehicles, a front constructed of two stiffened portions and an intermediate flexible portion connecting said stiffened portions, and elastic connections secured to said stiffened portions and spanning said flexible portion to maintain it in a distended condition upon vehicles of different widths, and means for attaching said front to the bow of a vehicle top whereby it may readily be detached by pressure upon the inside of the front.

3. In a combined front and apron for vehicles, a front provided with eyelets at its upper edge, outwardly turned hooks on the bow of the vehicle adapted to be engaged by said eyelets, and elastic connections and clips attached to the lower ends of the front, said clips adapted to be held in frictional engagement with the bow of the vehicle by said elastic connections, whereby the eyelets and clips of said front may readily be detached from the bow by pressure upon the inside of the front.

4. In a combined front and apron for vehicles, a front constructed of two stiffened portions and an intermediate longitudinal flexible portion connecting said stiffened portions, and elastic connections secured to said stiffened portions and spanning said flexible portion to maintain it in a distended condition when in use upon vehicles of different widths, eyelets in the upper edge of said front, outwardly turned hooks on the bow of the vehicle to be engaged by said eyelets, and clips attached to the opposite lower edges of said front and adapted to be held in frictional engagement with the bow of the vehicle by said elastic connections, whereby said front may readily be detached from the bow of the vehicle by pressure upon the inside of the front.

5. In a combined front and apron for vehicles, an apron having elastic hooks for attaching it to the dashboard of the vehicle and provided with a series of separable fastener members at its upper edge, a front constructed of two stiffened portions and an intermediate longitudinal flexible portion connecting said stiffened portions, and a skirt portion provided with a series of complemental fastener members to be connected with the fastener members on said apron, elastic connections fixed to said stiffened portions and spanning said flexible portion to maintain said flexible portion in a distended condition to fit vehicle bows of varying widths, eyelets in the upper edge of said front, outwardly turned hooks on the bow to be engaged by the said eyelets, and clips on the lower opposite edges of said front adapted to be held in frictional engagement with the bow by said elastic connections, whereby the front may readily be detached from the bow by pressure upon the inside of the front.

In testimony whereof we have hereunto set our hands this 2nd day of August A. D. 1907.

WILLIAM J. CAMPBELL.
GEORGE W. HEDRICK.

Witnesses:
C. C. HEDRICK,
M. S. CLINEDINST.